3,634,371
SOLUTION POLYMERIZATION IN THE PRESENCE OF A SALT OF PEROXYDISULFURIC ACID WITH AN ORGANIC NITROGENOUS BASE
Heinz Pohlemann, Limburgerhof, Frithjof Roemer, Hambach, and Johann Swoboda, Heidelberg, Germany, assignors to Badische Anilin- & Soda-Fabrik Aktiengesellschaft, Ludwigshafen (Rhine), Germany
No Drawing. Filed July 18, 1969, Ser. No. 843,241
Claims priority, application Germany, July 20, 1968, P 17 70 935.2
Int. Cl. C08f 3/76, 15/22
U.S. Cl. 260—85.5                                                     17 Claims

ABSTRACT OF THE DISCLOSURE

Polymerization of olefinically unsaturated organic compounds, particularly mixtures of monomers containing at least 80% by weight of acrylonitrile, in an organic solvent with a salt of peroxydisulfuric acid which is soluble in the said solvent. Pale to colorless and clear polymers are obtained.

---

This invention relates to a process for the polymerization of olefinically unsaturated organic compounds in organic solvents.

It is known that olefinically unsaturated organic compounds can be polymerized in organic solvents with free radical forming initiators such as azoisobutyronitrile or peroxy compounds. These initiators are not satisfactory in every respect because they often cause troublesome discoloration of the polymers or their solutions. Initiators such as the sodium, potassium or ammonium salts of peroxydisulfuric acid which do not exhibit this disadvantage are not suitable for polymerization in organic solvents because of their sparing solubility.

It is an object of this invention to provide a method of polymerizing olefinically unsaturated organic compounds, particularly acrylonitrile, to form pale to colorless and clear polymers. These and other objects which will appear from the following description are achieved by this invention.

In accordance with the invention a method of polymerizing olefinically unsaturated organic compounds in organic solvents with polymerization initiators comprises using as the initiator a salt of peroxydisulfuric acid which is soluble in the said initiator.

Examples of olefinically unsaturated organic compounds which can be polymerized according to the invention are $\alpha,\beta$-olefinically unsaturated carboxylic acids having three to five carbon atoms such as acrylic acid, methacrylic acid or crotonic acid, or their derivatives such as esters with monohydroxyl compounds having one to eighteen carbon atoms such as methyl acrylate, butyl acrylate or 2-ethylhexyl acrylate or amides or nitriles of these acids, and also vinylaromatics such as styrene, or vinyl esters of monocarboxylic acids such as vinyl acetate or vinyl propionate, and also vinyl halides such as vinyl chloride or vinylidene chloride, further olefinically unsaturated sulfonic acids such as vinylsulfonic acid, 3-sulfopropyl methacrylate, or olefinically unsaturated basic nitrogen compounds such as vinylpyridines or 2-diethylaminoethyl acrylate, or mixtures of the said monomers.

Acrylonitrile or a mixture of monomers containing more than 80% by weight of acrylonitrile can be polymerized particularly advantageously according to the invention. The monomers other than acrylonitrile are particularly those specified above.

Examples of organic solvents in which the polymerization may be carried out are: alcohols, ketones, or (particularly in the polymerization of acrylonitrile or mixtures of monomers containing mainly acrylonitrile) dimethylformamide, dimethylacetamide, butyrolactone, ethylene carbonate, dimethyl sulfoxide or tetramethylenesulfone.

The soluble salts of peroxydisulfuric acid may be those which are soluble in organic solvents, particularly salts of peroxydisulfuric acid with organic bases containing nitrogen. Suitable bases include primary, secondary, tertiary and quaternary nitrogen bases having aliphatic linear or branched radicals having one to thirty, particularly two to eight, carbon atoms, cycloaliphatic radicals having five to ten ring carbon atoms or araliphatic radicals having six to ten ring carbon atoms. Hydrocarbon radicals are particularly suitable as radicals, but these radicals may also contain substituents in the chain, such as halogen, COOR, $CONH_2$ or $CONR_2$, or heteroatoms such as oxygen or nitrogen atoms. Suitable radicals are for example methyl, ethyl, n-propyl, n-, iso- or t-butyl, n-hexyl, n-lauryl, cyclohexyl, benzyl, 3-methoxypropyl or 2-hydroethyl. Radicals present on a nitrogen atom may be identical or different. Basic heterocycles such as morpholine, pyrrolidine, pyridine or substituted pyridines are also suitable as bases. It is advantageous to use a salt of peroxydisulfuric acid with two equivalents of base. Generally organic bases are chosen whose peroxydisulfates are soluble in the solvent used and which are not oxidized by the peroxydisulfuric acid; this can be ascertained by a preliminary experiment without difficulty.

The soluble salt of peroxydisulfuric acid is added in solid or dissolved form to the polymerization mixture in an amount of from 0.01 to 2%, advantageously from 0.03 to 1.2% and particularly from 0.05 to 0.8%, by weight with reference to the monomers.

The salts of peroxydisulfuric acid are generally prepared by reacting aqueous or alcoholic solutions of the abovementioned organic bases with aqueous solutions of peroxydisulfuric acid at temperatures of from about 0° to 20° C., the solutions of the bases generally being placed in the reactor first. In some cases, such as when benzylamine is used, the peroxydisulfate crystallizes out from the aqueous or aqueous alcoholic solution. If this is not the case, the solution may be concentrated in vacuo at from 15° to 20° C. The salts of peroxydisulfuric acid are generally prepared with 2 equivalents of base. A temperature of less than 25° C. is advantageously chosen for storing the salts.

It has proved to be advantageously to prepare peroxydisulfuric acid from its sodium, potassium or ammonium salts in aqueous solutions by means of acid ion exchangers. Generally from 5 to 40% solutions are prepared. It is recommended that low temperatures, such as 0° to 5° C., should be used and that the peroxydisulfuric acid should be reacted without undue delay because aqueous solutions of this acid do not generally have adequate stability.

Polymerization may be carried out in the conventional way in conventional apparatus. It may be carried out continuously or in batches. It is generally carried out at from 35° to 100° C., particularly at from 50° to 90° C., advantageously under a protective gas. Polymerization is usually carried out in from 20 to 40% solution.

The polymers prepared according to the invention have many applications. For example the acrylonitrile polymers are preferably used for the production of shaped articles, particularly filaments, threads or fibers, with or without the use of conventional additives such as stabilizers, antistatic agents or dyes. Direct processing of the acrylonitrile polymer solutions obtained by polymerization, for example by dry or wet spinning without previous isolation of the polymer, is advantageous.

Pale to colorless and clear polymer solutions are obtained in the process according to the invention. This is particularly surprising in the production of acrylonitrile polymers because in this case discoloration very readily takes place. The acrylonitrile polymers obtained have molecular weights which are well suited to the production of filaments and threads. Polymers having K values of from 80 to 95 (measured according to the formula of H. Fikentscher, Cellulosechemie, 13, 58 (1932)) can be readily obtained. Shaped articles prepared from the polymers according to this invention have a particularly high degree of whiteness.

It is an advantage that even in the polymerization of acrylonitrile or mixtures of monomers containing mainly acrylonitrile in dimethylformamide (in which discoloration takes place particularly readily) pale to practically colorless polymer solutions which can be processed into shaped articles having a very high degree of whiteness are obtained when using the initiators according to this invention.

The invention is illustrated by the following examples. The parts and percentages specified in the examples are by weight.

EXAMPLE 1

| | Parts |
|---|---|
| Acrylonitrile | 27.7 |
| Methyl acrylate | 2.0 |
| Sodium methacroyloxypropyl sulfonate | 0.3 |
| Dimethylformamide | 70.0 |
| Bis-(n-butylammonium)-peroxydisulfate | 0.106 |

The mixture is stirred at 45° C. under nitrogen for twenty hours. At a conversion of 80%, the K value of the practically colorless, clear polymer is 85 (according to Fikentscher, loc. cit.).

EXAMPLE 2

(a)

| | Parts |
|---|---|
| Acrylonitrile | 27.7 |
| Methyl acrylate | 2.0 |
| Sodium methacroyloxypropyl sulfonate | 0.3 |
| Dimethylformamide | 70.0 |
| Bis-(benzylammonium)-peroxydisulfate | 0.13 |

A practically colorless, clear polymer solution is obtained in ten hours at temperatures of from 40° to 50° C. The conversion is 70% and the K value (according to Fikentscher) of the polymer is 95. The polymer solution may be readily processed into filaments and threads having a high degree of whiteness by wet or dry spinning.

(b)

If the experiment is repeated with potassium peroxydisulfate instead of bis-(benzylammonium)-peroxy disulfate, a cloudy polymer solution is obtained which has to be filtered before it is used for spinning.

EXAMPLES 3–11

In accordance with Example 1, acryonitrile and the said comonomers are polymerized with the peroxydisulfates of the table at 50° C., 1 millimole of the peroxydisulfate being used for 100 grams of monomer. The results are shown in the table. All solutions are practically colorless and capable of being processed into filaments and threads having a high degree of whiteness by wet or dry spinning.

TABLE

| Ex. | Peroxydisulfate | Percent conversion | K value |
|---|---|---|---|
| 3 | Bis-(dimethylammonium) | 68 | 80 |
| 4 | Bis-(n-propylammonium) | 72 | 82 |
| 5 | Bis-(N-methyl-N-cyclohexylammonium) | 77 | 80 |
| 6 | Bis-(tert-butylammonium) | 76 | 79 |
| 7 | Bis-(tri-2-hydroethylammonium) | 62 | 78 |
| 8 | Bis-(morpholino) | 76 | 87 |
| 9 | Bis-(pyridinium) | 60 | 86 |
| 10 | Bis-(pyrrolidinium) | 73 | 84 |
| 11 | Bis-(N-methyl-N-benzylammonium) | 84 | 80 |

We claim:
1. In a process for the solution polymerization of at least one olefinically unsaturated organic monomer in an organic solvent in the presence of a small amount of a polymerization initiator, the improvement which comprises using as the polymerization initiator a salt of peroxydisulfuric acid with an organic nitrogenous base, said salt being soluble in said organic solvent.

2. A process as claimed in claim 1 wherein said salt as the polymerization initiator is used in an amount of 0.01 to 2% by weight with reference to said at least one monomer.

3. A process as claimed in claim 1 wherein said salt as the polymerization initiator is used in an amount of 0.05 to 0.8% by weight with reference to said at least one monomer.

4. In a process for the solution polymerization of acrylonitrile or a mixture of olefinically unsaturated organic monomers containing at least 80% by weight of acrylonitrile in an organic solvent in the presence of a small amount of a polymerization initiator, the improvement which comprises using as the polymerization initiator about 0.01 to 2% by weight, with reference to the monomers, of a salt of peroxydisulfuric acid with an organic nitrogenous base, said salt being soluble in said organic solvent.

5. A process as claimed in claim 4 wherein said salt as the polymerization initiator is used in an amount of 0.03 to 1.2% by weight with reference to the monomers.

6. A process as claimed in claim 4 wherein said salt as the polymerization initiator is used in an amount of 0.05 to 0.8% by weight with reference to the monomers.

7. A process as claimed in claim 4 wherein said salt is bis-(n-butylammonium)-peroxydisulfate.

8. A process as claimed in claim 4 wherein said salt is bis-(benzylammonium)-peroxydisulfate.

9. A process as claimed in claim 4 wherein said salt is bis-(dimethylammonium)-peroxydisulfate.

10. A process as claimed in claim 4 wherein said salt is bis-(n-propylammonium)-peroxydisulfate.

11. A process as claimed in claim 4 wherein said salt is bis-(N-methyl-N-cyclohexylammonium-peroxydisulfate.

12. A process as claimed in claim 4 wherein said salt is bis-(tert.-butylammonium)-peroxydisulfate.

13. A process as claimed in claim 4 wherein said salt is bis-(tri-2-hydroxyethylammonium)-peroxydisulfate.

14. A process as claimed in claim 4 wherein said salt is bis-(morpholino)-peroxydisulfate.

15. A process as claimed in claim 4 wherein said salt is bis-(pyridinium)-peroxydisulfate.

16. A process as claimed in claim 4 wherein said salt is bis-(pyrrolidinium)-peroxydisulfate.

17. A process as claimed in claim 4 wherein said salt is bis-(N-methyl-N-benzylammonium)-peroxydisulfate.

References Cited

UNITED STATES PATENTS 3,060,157  10/1962  Goodman et al. ____ 260—85.5 F
3,366,605  1/1968  Seiner _____ 260—85.5 F HARRY WONG, Jr., Primary Examiner U.S. Cl. X.R.

260—29.1, 30.4, 30.8, 32.6, 32.8, 33.4, 79.3, 80, 80.3, 85.7, 87.5, 87.7, 88.1, 88.3, 88.7, 89.1, 89.3, 89.5, 89.7, 91.7, 92.8, 93.5

PO-1050
(5/69)

UNITED STATES PATENT OFFICE
CERTIFICATE OF CORRECTION

Patent No. 3,634,371          Dated January 11, 1972

Inventor(s) Heinz Pohlemann et al

It is certified that error appears in the above-identified patent and that said Letters Patent are hereby corrected as shown below:

Column 1, line 4, "NITROGENOUS" should read -- NITROGENEOUS --.

Column 2, line 52, "advantageously" should read -- advantageous --.

Column 4, in the table, example 7, "Bis-(tri-2-hydroethylammonium)' should read -- Bis-(tri-2-hydroxyethylammounium) --; line 17, claim 1, "nitrogenous" should read -- nitrogeneous --; line 35, claim 4, "nitrogenous" should read -- nitrogeneous --.

Signed and sealed this 22nd day of August 1972.

(SEAL)
Attest:

EDWARD M.FLETCHER,JR.                ROBERT GOTTSCHALK
Attesting Officer                    Commissioner of Patents